US012166447B2

(12) United States Patent
Westerby et al.

(10) Patent No.: US 12,166,447 B2
(45) Date of Patent: Dec. 10, 2024

(54) ELECTRONIC BRAKING IN A POWER TOOL

(71) Applicant: MILWAUKEE ELECTRIC TOOL CORPORATION, Brookfield, WI (US)

(72) Inventors: Carl B. Westerby, Menomonee Falls, WI (US); Timothy R. Obermann, Waukesha, WI (US); Alex Huber, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/346,529

(22) Filed: Jul. 3, 2023

(65) Prior Publication Data
US 2023/0421078 A1    Dec. 28, 2023

Related U.S. Application Data

(63) Continuation of application No. 17/372,936, filed on Jul. 12, 2021, now Pat. No. 11,695,352, which is a
(Continued)

(51) Int. Cl.
*H02P 3/14* (2006.01)
*B24B 23/02* (2006.01)
(Continued)

(52) U.S. Cl.
CPC .................. *H02P 3/14* (2013.01); *B25F 5/00* (2013.01); *H02P 3/22* (2013.01); *H02P 7/29* (2013.01);
(Continued)

(58) Field of Classification Search
CPC ...... H02P 3/14; H02P 3/22; H02P 7/29; B25F 5/00; B25F 5/02; B24B 23/02; B24B 47/12
(Continued)

(56) References Cited

U.S. PATENT DOCUMENTS 3,611,092 A   10/1971   Wilmunder
3,732,475 A    5/1973   Geerling
(Continued)

FOREIGN PATENT DOCUMENTS

AT      391384 B      9/1990
DE    2519509 A1    11/1975
(Continued)

OTHER PUBLICATIONS

International Search Report and Written Opinion for Application No. PCT/US2019/012156, dated Apr. 30, 2019 (11 pages).
(Continued)

*Primary Examiner* — David Luo
(74) *Attorney, Agent, or Firm* — Michael Best & Friedrich LLP

(57) ABSTRACT

A power tool includes a three-phase DC motor, a power switching network, a power source, and an electronic processor. A first phase of the motor is connected between a first low side electronic switch and a power source electronic switch, and connected to the power source via a first high side electronic switch in parallel with a diode. The electronic processor is configured to receive an indication to stop the motor during operation of the motor and activate the first low side electronic switch and a second low side electronic switch for a first predetermined time responsive to receiving the indication such that a back-electromagnetic force generated by the motor is stored in the first phase. The electronic processor is configured to deactivate the second low side electronic switch after the first predetermined time such that a first regenerative current is provided to the power source via the diode.

16 Claims, 10 Drawing Sheets

Related U.S. Application Data continuation of application No. 16/896,600, filed on Jun. 9, 2020, now Pat. No. 11,075,594, which is a continuation of application No. 16/238,965, filed on Jan. 3, 2019, now Pat. No. 10,720,860.

(60) Provisional application No. 62/613,238, filed on Jan. 3, 2018.

(51) Int. Cl.
  *B24B 47/12* (2006.01)
  *B25F 5/00* (2006.01)
  *B25F 5/02* (2006.01)
  *H02P 3/22* (2006.01)
  *H02P 7/29* (2016.01)

(52) U.S. Cl.
  CPC .............. *B24B 23/02* (2013.01); *B24B 47/12* (2013.01); *B25F 5/02* (2013.01)

(58) Field of Classification Search
  USPC ............................................ 318/17, 56, 57
  See application file for complete search history.

(56) References Cited

U.S. PATENT DOCUMENTS

| | | |
|---|---|---|
| 3,783,359 A | 1/1974 | Malkiel |
| 3,947,740 A | 3/1976 | Tsuboi |
| 4,140,382 A | 2/1979 | Ichiyanagi et al. |
| 4,144,482 A | 3/1979 | Schwab |
| 4,669,841 A | 6/1987 | Kaneko et al. |
| 4,744,018 A | 5/1988 | Eccleston |
| 4,761,600 A | 8/1988 | D'Atre et al. |
| 4,835,409 A | 5/1989 | Bhagwat et al. |
| 4,933,609 A | 6/1990 | Clark |
| 5,063,319 A | 11/1991 | Mason et al. |
| 5,291,106 A | 3/1994 | Murty et al. |
| 5,294,874 A | 3/1994 | Hessenberger et al. |
| 5,332,954 A | 7/1994 | Lankin |
| 5,361,022 A | 11/1994 | Brown |
| 5,449,992 A | 9/1995 | Geiger et al. |
| 5,505,043 A | 4/1996 | Baginski et al. |
| 5,598,082 A | 1/1997 | Gilpin et al. |
| 5,600,217 A | 2/1997 | Bartlett |
| 5,602,452 A | 2/1997 | Underhill |
| 5,614,799 A | 3/1997 | Anderson et al. |
| 5,635,804 A | 6/1997 | Tanaka et al. |
| 5,644,112 A | 7/1997 | Geiger et al. |
| 5,659,231 A | 8/1997 | Svarovsky et al. |
| 5,764,021 A | 6/1998 | Gutsche |
| 5,861,724 A | 1/1999 | Ackerson |
| 5,892,885 A | 4/1999 | Smith et al. |
| 5,898,284 A | 4/1999 | Sasajima |
| 5,913,373 A | 6/1999 | Forrest |
| 6,002,226 A | 12/1999 | Collier-Hallman et al. |
| 6,005,359 A | 12/1999 | Brambilla et al. |
| 6,013,993 A | 1/2000 | Barbisch |
| 6,078,156 A | 6/2000 | Spurr |
| 6,078,157 A | 6/2000 | Seiler et al. |
| 6,084,366 A | 7/2000 | Koselke et al. |
| 6,094,025 A | 7/2000 | Rosa |
| 6,118,241 A | 9/2000 | Kazlauskas |
| 6,160,368 A | 12/2000 | Plutowski |
| 6,166,500 A | 12/2000 | Makaran |
| 6,170,241 B1 | 1/2001 | Shibilski et al. |
| 6,188,192 B1 | 2/2001 | Chen |
| 6,232,758 B1 | 5/2001 | Konda et al. |
| 6,236,177 B1 | 5/2001 | Zick et al. |
| 6,237,390 B1 | 5/2001 | Honsel et al. |
| 6,310,452 B1 | 10/2001 | Deck et al. |
| 6,373,207 B1 | 4/2002 | Yablonovitch |
| 6,384,555 B1 | 5/2002 | Tanaka |
| 6,424,799 B1 | 7/2002 | Gilmore |
| 6,448,727 B1 | 9/2002 | Rotterhusen |
| 6,448,732 B1 | 9/2002 | Block |
| 6,486,625 B1 | 11/2002 | Vilou |
| 6,525,495 B2 | 2/2003 | Bianchi |
| 6,536,536 B1 | 3/2003 | Gass et al. |
| 6,548,973 B1 | 4/2003 | Chloupek |
| 6,630,805 B2 | 10/2003 | Makaran |
| 6,680,596 B1 | 1/2004 | DeCicco |
| 6,686,719 B2 | 2/2004 | Cochoy et al. |
| 6,741,050 B2 | 5/2004 | Wissmach et al. |
| 6,741,051 B2 | 5/2004 | Chu |
| 6,998,804 B2 | 2/2006 | Meyer et al. |
| 7,023,159 B2 | 4/2006 | Gorti et al. |
| 7,075,257 B2 | 7/2006 | Carrier et al. |
| 7,084,779 B2 | 8/2006 | Uneyama |
| 7,602,137 B2 | 10/2009 | Du et al. |
| 7,834,565 B2 * | 11/2010 | Armstrong ................. H02P 6/10 318/400.42 |
| 7,932,693 B2 | 4/2011 | Lee et al. |
| 8,030,861 B2 | 10/2011 | Hoogzaad |
| 8,179,069 B2 * | 5/2012 | Matsunaga ................ B25F 5/00 318/434 |
| 8,339,075 B2 | 12/2012 | Hoogzaad |
| 8,365,350 B2 | 2/2013 | Cochran et al. |
| 8,400,089 B2 | 3/2013 | Bonner et al. |
| 8,552,669 B2 * | 10/2013 | Kusakawa ................. H02P 7/29 388/811 |
| 8,587,230 B2 | 11/2013 | Pant et al. |
| 8,587,231 B2 | 11/2013 | Pant |
| 8,729,839 B2 | 5/2014 | Suzuki et al. |
| 8,988,015 B2 | 3/2015 | Forster et al. |
| 9,054,567 B2 | 6/2015 | Ramu |
| 9,438,141 B2 | 9/2016 | Ishikawa et al. |
| 9,592,593 B2 * | 3/2017 | Chen ................... B25B 23/1475 |
| 9,667,175 B2 | 5/2017 | Ogawa |
| 10,333,455 B2 | 6/2019 | Cheng et al. |
| 2002/0056858 A1 | 5/2002 | Torikoshi et al. |
| 2002/0158593 A1 | 10/2002 | Henderson et al. |
| 2003/0042859 A1 | 3/2003 | Gorti et al. |
| 2003/0117095 A1 | 6/2003 | Gorti |
| 2004/0037548 A1 | 2/2004 | Higuma |
| 2004/0041531 A1 | 3/2004 | Chu |
| 2004/0066159 A1 | 4/2004 | Zack et al. |
| 2004/0207251 A1 | 10/2004 | Hahn et al. |
| 2010/0005614 A1 | 1/2010 | Cochran et al. |
| 2010/0007293 A1 | 1/2010 | Meadors et al. |
| 2011/0031916 A1 | 2/2011 | Bonner et al. |
| 2011/0068723 A1 | 3/2011 | Maiocchi |
| 2012/0104988 A1 | 5/2012 | Ramu |
| 2013/0214716 A1 | 8/2013 | Barfus et al. |
| 2013/0264977 A1 | 10/2013 | Bonner et al. |
| 2015/0137717 A1 | 5/2015 | Ishikawa et al. |
| 2015/0158160 A1 | 6/2015 | Kato |
| 2015/0340974 A1 | 11/2015 | Usselman et al. |
| 2016/0336793 A1 | 11/2016 | Seman, Jr. et al. |
| 2017/0093315 A1 | 3/2017 | Ichikawa |
| 2017/0126152 A1 | 5/2017 | Larsén et al. |
| 2017/0190041 A1 | 7/2017 | Dey, IV et al. |

FOREIGN PATENT DOCUMENTS

| | | |
|---|---|---|
| DE | 3324483 A1 | 1/1985 |
| DE | 234254 A1 | 3/1986 |
| DE | 3539841 A1 | 3/1987 |
| DE | 4022637 A1 | 1/1992 |
| DE | 4038199 A1 | 6/1992 |
| DE | 4201005 A1 | 7/1993 |
| DE | 4207362 A1 | 9/1993 |
| DE | 4223216 A1 | 1/1994 |
| DE | 4429962 A1 | 2/1996 |
| DE | 4227719 C2 | 7/1996 |
| DE | 19540740 C1 | 8/1996 |
| DE | 19951747 C1 | 3/2001 |
| DE | 19959785 A1 | 6/2001 |
| DE | 10222540 A1 | 11/2003 |
| EP | 0038214 A2 | 10/1981 |
| EP | 0038722 A1 | 10/1981 |
| EP | 0076039 A1 | 4/1983 |
| EP | 0080278 A1 | 6/1983 |
| EP | 0280478 A2 | 3/1988 |

(56) References Cited

FOREIGN PATENT DOCUMENTS

| | | |
|---|---|---|
| EP | 0551895 A1 | 7/1993 |
| EP | 0551896 A1 | 7/1993 |
| EP | 551909 A1 | 7/1993 |
| EP | 0594115 A1 | 4/1994 |
| EP | 0633156 A1 | 1/1995 |
| EP | 0501036 B1 | 3/1995 |
| EP | 0700148 A1 | 3/1996 |
| EP | 0740407 A2 | 10/1996 |
| EP | 2506423 A2 | 10/2012 |
| GB | 2273373 A1 | 6/1994 |
| GB | 2314980 A | 1/1998 |
| GB | 2334753 A | 9/1999 |
| JP | S4979000 A | 7/1974 |
| JP | S5032423 A | 3/1975 |
| JP | S52156326 A | 12/1977 |
| JP | S536815 A | 1/1978 |
| JP | S5335116 A | 4/1978 |
| JP | S5437214 A | 3/1979 |
| JP | S55117480 A | 9/1980 |
| JP | S5660750 A | 5/1981 |
| JP | S5727791 U | 2/1982 |
| JP | S57170084 A | 10/1982 |
| JP | S5815473 A | 1/1983 |
| JP | S5831791 U | 3/1983 |
| JP | S58175980 A | 10/1983 |
| JP | S58190290 A | 11/1983 |
| JP | S6046785 A | 3/1985 |
| JP | S60219976 A | 11/1985 |
| JP | S61295885 A | 12/1986 |
| JP | S6253189 A | 3/1987 |
| JP | S62254679 A | 11/1987 |
| JP | S6339482 A | 2/1988 |
| JP | S6359213 A | 3/1988 |
| JP | H03145984 A | 6/1991 |
| JP | H04178192 A | 6/1992 |
| JP | H04208085 A | 7/1992 |
| JP | H05184174 A | 7/1993 |
| JP | H06335116 A | 12/1994 |
| JP | H09117173 A | 5/1997 |
| JP | H11215871 A | 8/1999 |
| JP | H11275880 A | 10/1999 |
| JP | 2000115997 A | 4/2000 |
| JP | 2001275374 A | 10/2001 |
| JP | 2002218676 A | 8/2002 |
| JP | 2002281777 A | 9/2002 |
| JP | 2003088150 A | 3/2003 |
| JP | 2003250286 A | 9/2003 |
| TW | 200304863 A | 10/2003 |
| WO | WO8803337 A1 | 5/1988 |
| WO | WO9000832 A1 | 1/1990 |
| WO | WO9205626 A1 | 4/1992 |
| WO | WO9419208 A1 | 9/1994 |
| WO | WO0011691 A1 | 2/2000 |
| WO | WO2015179318 A1 | 11/2015 |
| WO | WO2016085862 A1 | 6/2016 |

OTHER PUBLICATIONS

Search Report and Official Letter for Taiwanese Application No. 108100072, dated Nov. 14, 2019 (12 pages).

Taiwanese Intellectual Property Office Action and Search Report for Application No. 108100072 dated Apr. 27, 2020 (6 pages including statement of relevance).

* cited by examiner

ELECTRONIC BRAKING IN A POWER TOOL

RELATED APPLICATIONS

This application is a continuation of U.S. patent application Ser. No. 17/372,936, filed Jul. 12, 2021, which is a continuation of U.S. patent application Ser. No. 16/896,600, filed Jun. 9, 2020, which is a continuation of U.S. patent application Ser. No. 16/238,965, filed Jan. 3, 2019, which claims the benefit of U.S. Provisional Patent Application No. 62/613,238, filed Jan. 3, 2018, the entire content of each of which is hereby incorporated by reference.

FIELD

The present invention relates to using electronic braking to stop a motor in a power tool.

SUMMARY

In one embodiment, a power tool is provided including a three-phase DC motor, a power switching network, a power source, and an electronic processor. The power switching network includes a plurality of high side electronic switches and a plurality of low side electronic switches. A first phase of the motor is connected between a first low side electronic switch and a power source electronic switch. The first phase of the motor is further connected to the power source via a first high side electronic switch. The first high side electronic switch is in parallel with a diode. The electronic processor is in communication with the power switching network and configured to receive an indication to stop the motor during operation of the motor. The electronic processor is further configured to activate the first low side electronic switch and a second low side electronic switch for a first predetermined time in response to receiving the indication to stop the motor such that a back-electromagnetic force generated by the motor is stored in the first phase of the motor. The electronic processor is further configured to deactivate the second low side electronic switch after the first predetermined time such that a first regenerative current is provided to the power source via the diode.

In another embodiment, a power tool is provided including a three-phase DC motor, a power switching network, a power source, and an electronic processor. The power switching network includes a plurality of high side electronic switches and a plurality of low side electronic switches. A first phase of the motor is connected between a first high side electronic switch and a first low side electronic switch. The first phase of the motor is further connected between a second high side electronic switch and a second low side electronic switch. The electronic processor configured to receive an indication to operate the motor. The electronic processor is further configured to activate the first high side electronic switch and the first low side electronic switch in response to receiving the indication to operate the motor to operate the motor such that a back-electromagnetic force generated by the motor is connected in a first polarity relative to the power source. The electronic processor is further configured to receive an indication to stop the motor. The electronic processor is further configured to deactivate the first high side electronic switch and the first low side electronic switch, and activate the second high side electronic switch and the second low side electronic switch in response to receiving the indication to stop the motor such that the back-electromagnetic force generated by the motor is connected in a second polarity relative to the power source.

In another embodiment, a method for braking a motor in a battery powered power tool is provided. The method includes receiving an indication at an electronic processor to stop the motor during operation of the motor. The electronic processor is in communication with a power switching network comprising a plurality of high side electronic switches and a plurality of low side electronic switches. A first phase of the motor is connected between a first low side electronic switch and a power source electronic switch. The first phase of the motor is further connected to a power source of the power tool via a first high side electronic switch. The first high side electronic switch is electrically parallel with a diode. The method further includes activating the first low side electronic switch and a second low side electronic switch for a first predetermined time in response to receiving the indication to stop the motor such that a back-electromagnetic force generated by the motor is stored in the first phase of the motor. The method also includes deactivating the second low side electronic switch after the first predetermined time such that a first regenerative current is provided to the power source via the diode.

Other aspects of the invention will become apparent by consideration of the detailed description and accompanying drawings.

Figure 1:
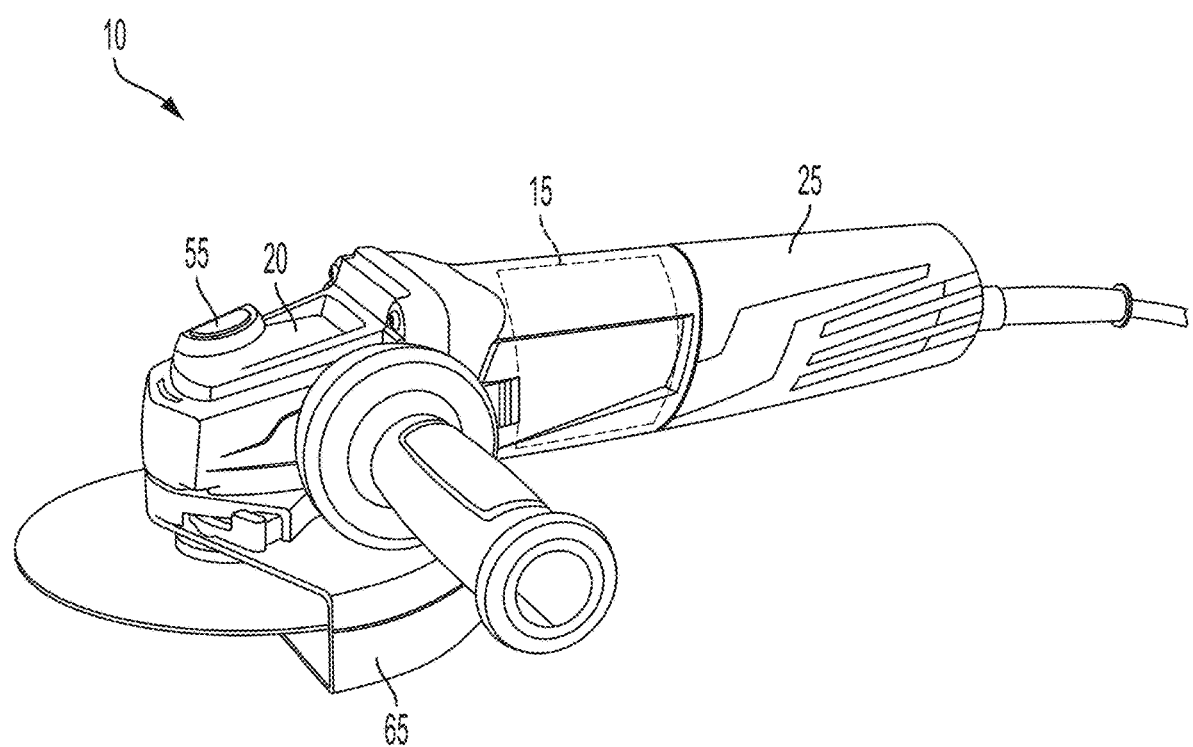
FIG. 1 illustrates a power tool according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Further, a plurality of hardware and software based devices, as well as a plurality of different structural components may be utilized to implement the invention. Furthermore, and as described in subsequent paragraphs, the specific configurations illustrated in the drawings are intended to provide example embodiments and that other alternative configurations are possible. The term "electronic processor" is used as identifying a unit performing specific functions, and it should be understood that, unless otherwise stated, those functions can be carried out by a single electronic processor, or multiple electronic processors arranged in any form, including parallel electronic processors, serial electronic processors, tandem electronic processors or electronic cloud processing/ cloud computing configurations.

DETAILED DESCRIPTION

FIG. 1 illustrates a power tool 10 having a motor 15. In a power tool, such as the power tool 10 shown in FIG. 1, switching elements are selectively enabled and disabled by control signals from an electronic processor 135 (FIG. 2A) to selectively apply power from a power source (e.g., AC source such as a wall outlet) to drive the motor 15. In the illustrated embodiment, the power tool 10 is a grinder having a housing 20 with a handle portion 25. The power tool 10 further includes a trigger 55 or similar actuator, a power circuit 115 (FIG. 2A), and guard 65. Although the power tool 10 illustrated in FIG. 1 is an AC grinder, the present description applies also to other power tools having a motor such as, for example, an impacting wrench, a hammer drill, an impact hole saw, an impact driver, a drill, a reciprocating saw, a nailer, a stapler, and the like. The braking methods described below may be particularly helpful for power tools with a large moving mass such as a large disc grinder, a nailer, or a stapler. The present description also applies to brushed and brushless motors and controls. The present description applies to power tools that are powered with AC (alternating current) power as well as those power tools that are operated with DC (direct current) power (e.g., with a battery pack).

Figure 2A:
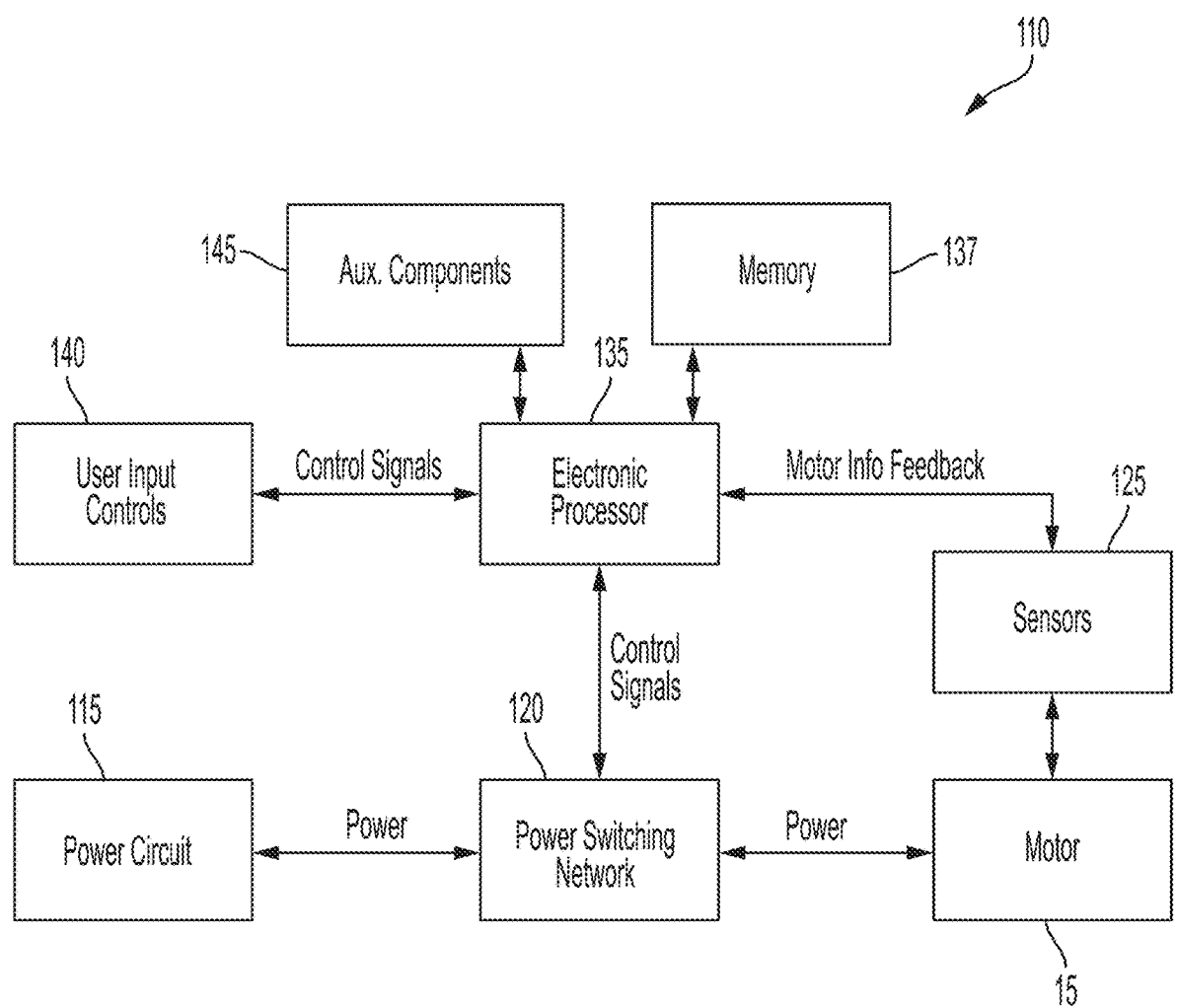
FIG. 2A illustrates a block diagram of the power tool.

FIG. 2A illustrates a simplified block diagram 110 of the power tool 10, which includes a power circuit 115, power switching network 120 (e.g., including different combinations and arrangements of Field Effect Transistors (FETs), triac(s), and/or other electronic switches, and the like), a motor 15, a plurality of sensors 125, an electronic processor 135, a memory 137, user input controls 140, and auxiliary components 145 (e.g., work lights (LEDs), current/voltage sensors, indicators, etc.). The power circuit 115 includes, for example, a rectifier, a step-down controller, a filter, and the like. The power circuit 115 conditions the power received from an external power source and distributes power to the electronics of the power tool 10 at an appropriate level. In some embodiments, the external power source may be a power tool battery pack that is rechargeable and uses, for instance, lithium ion cell technology. In some instances, the power circuit 115 may receive AC power (e.g., 120V/60 Hz) from a tool plug that is coupled to a standard wall outlet. In such instances, the power circuit 115 would then filter, condition, and rectify the received power to output DC power. Although not shown, the electronic processor 135 and other components of the power tool 10 are electrically coupled to the power circuit 115 such that the power circuit 115 provides power thereto.

The plurality of sensors 125 are distributed in various parts of the power tool 10 and detect different parameters and conditions of the power tool 10. For example, the sensors 125 include a speed sensor that outputs an indication of the motor speed. The speed sensor is coupled to the motor 15 and to the electronic processor 135. The speed sensor may include, for example, Hall-effect sensors, a rotary encoder, an inductive sensor, and the like. The speed sensor may generate an output signal (e.g., a pulse) of when a magnet of the rotor 80 rotates across the face of the sensor. Based on the motor feedback information from the speed sensor, the electronic processor 135 can directly determine the position, speed (i.e., velocity), and acceleration of the rotor 80. The power tool 10 can also include other types of sensors to detect different parameters of the power tool 10 during operation. For example, the power tool 10 may include voltage sensors, current sensors, rotation sensors, position sensors (e.g., magnetometer, accelerometer, etc.), and the like. Each of the plurality of the sensors 125 is coupled to the electronic processor 135 and transmits its output signal to the electronic processor 135.

The user input controls 140 include, for example, the trigger 55 and/or other actuators to change the operation of the power tool 10. The electronic processor 135 receives user control signals from the user input controls 140, such as a depression of the trigger 55 (or similar user actuator). In response to the motor feedback information and user controls, the electronic processor 135 transmits control signals to control the power switching network 120 to drive the motor 15. By selectively enabling and disabling the power switching network 120, power from the power circuit 115 is selectively applied to stator windings 75 of the motor 15 in a cyclic manner to cause rotation of the rotor of the motor 15. For example, to drive the motor 15, using the motor positioning information from the sensors 125, the electronic processor 135 determines where the rotor magnets are in relation to the stator windings 75 and (a) energizes a next stator winding pair (or pairs) in the predetermined pattern to provide magnetic force to the rotor magnets in a direct of desired rotation, and (b) de-energizes the previously energized stator winding pair (or pairs) to prevent application of magnetic forces on the rotor magnets that are opposite the direction of rotation of the rotor 80. Analogously, when the trigger 55 is released, the power switching network 120 is selectively enabled and disabled to generate magnetic forces by the stator windings 75 on the rotor magnets that the oppose direction of rotation of the rotor to brake the motor 15, as discussed in more detail below.

Figure 2B:
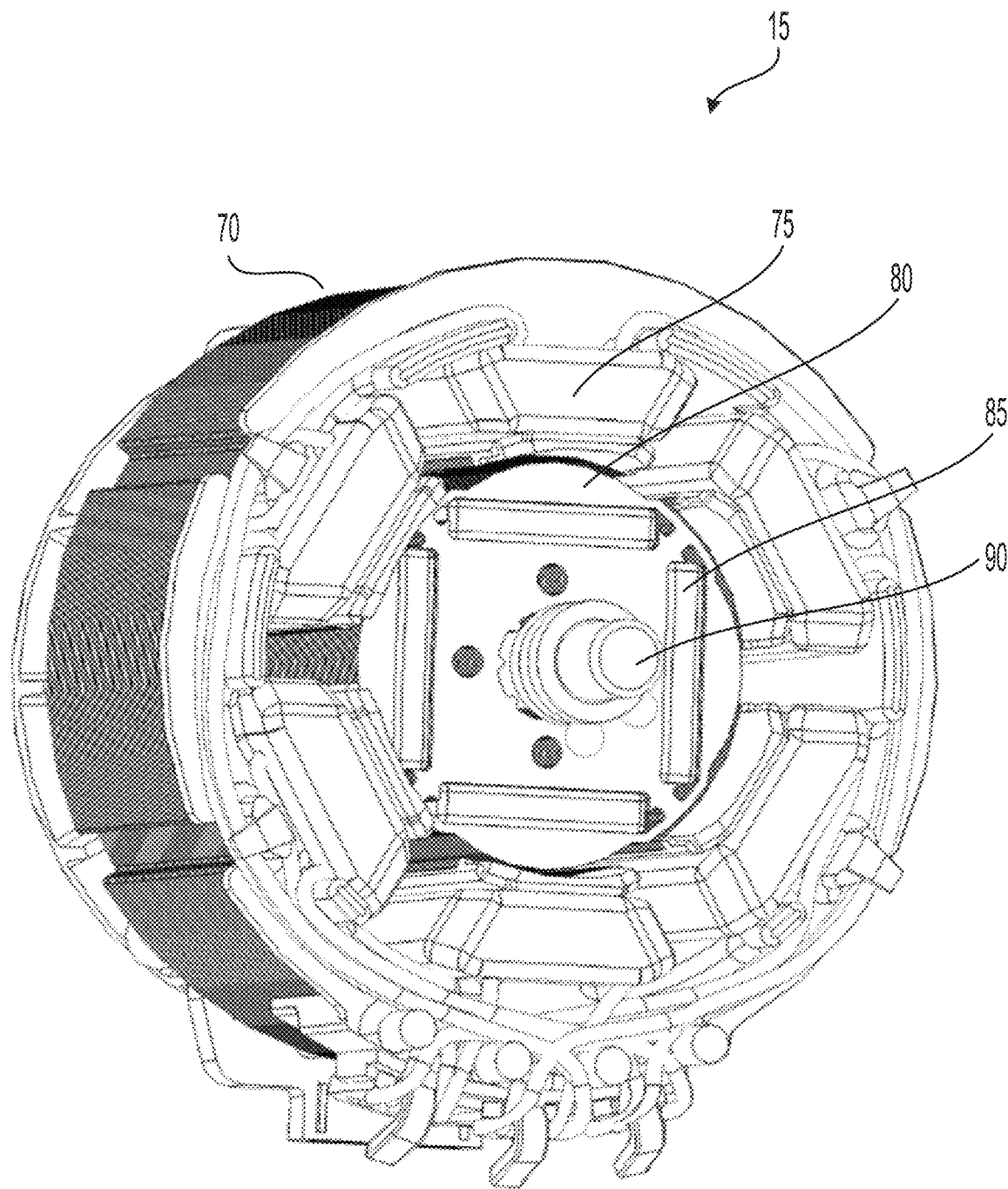
FIG. 2B illustrates a motor of the power tool.

FIG. 2B illustrates the motor 15 of the power tool 10 according to some embodiments. The motor 15 includes a stator 70 including six stator windings 75 forming three pairs of windings. Within the stator 70 is a rotor 80 including four permanent magnets 85. A core of the stator 70 is formed by a stack of laminations, as is a core of the rotor 80. A motor shaft 90 is fixed within the rotor 80 and drives an output of the power tool 10 (e.g., a grinder wheel) via a transmission (not shown). As described herein, current selectively provided to the stator windings 75 by the power switching network 120 (FIG. 2A) generates magnetic forces on permanent magnets 85, which drives rotation of the rotor 80 and, in some instances, provides forces opposite the direction of rotation of the rotor 80 to brake the rotor 80.

Figure 3:
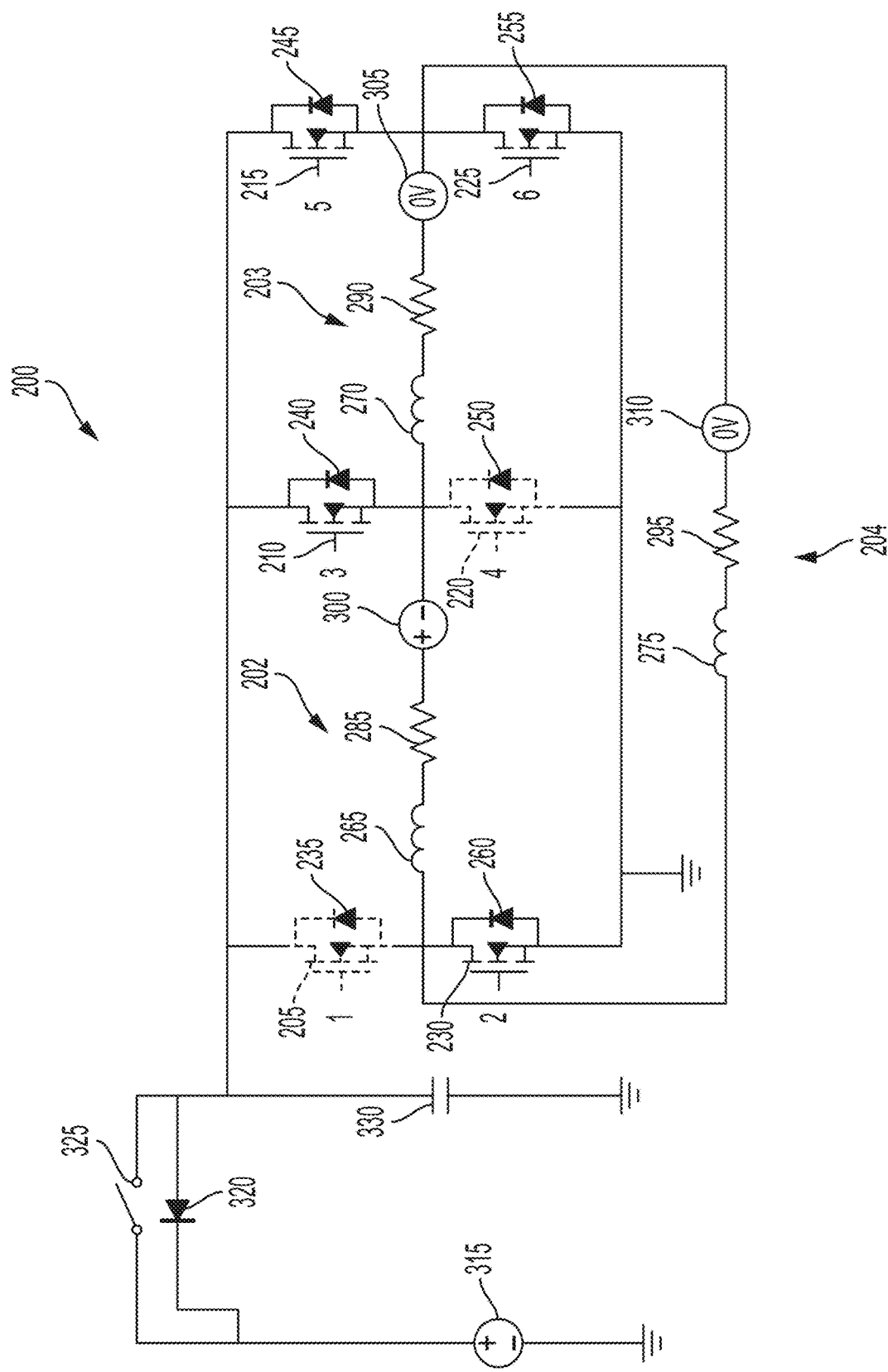
FIG. 3 illustrates a diagram of a motor and a power switching network of the power tool of FIGS. 1 and 2A.

FIG. 3 illustrates a diagram 200 of the motor 15 and the power switching network 120 when receiving power through the power circuit 115. In the illustrated embodiment, the motor 15 is a brushless DC motor including a first phase 202, a second phase 203, and a third phase 204. In other embodiments, however, different types of motors may be used. As shown in FIG. 3, the power switching network 120 includes three high side electronic switches 205, 210, 215 and three low side electronic switches 220, 225, 230. In the illustrated embodiment, the electronic switches 205-230 include MOSFETs. In other embodiments, other types of electronic switches may be used, such as bipolar junction transistors (BJT), insulated-gate bipolar transistors (IGBT), and other electronic switch types. Additionally, each electronic switch 205-230 is connected in parallel to a body diode 235, 240, 245, 250, 255, 260, respectively. In the diagram of FIG. 3, each phase of the motor 15 is represented by an inductor, a resistor, and a voltage source. Since the motor 15 is a three-phase motor, FIG. 3 illustrates three inductors 265-280, three resistors 285-295, and three voltage sources 300-310. Each inductor 265-280 represents the ability of each phase of the motor 15 to store power. Further each inductor 265-280 represents motor windings of each phase of the motor 15. Each resistor 285-295 symbolizes the resistance of each phase of the motor 15, and each voltage source 300-310 represents the back electromagnetic force generated (i.e., back-emf) in each phase. Back-emf is generated by the rotation of the rotor magnets (e.g., permanent magnets 85) inducing current in the stator windings (e.g., the stator windings 75).

The power switching network 120 receives power from the power circuit 115. In the illustrated embodiment, the power circuit 115 receives power from a battery pack and is represented in FIG. 3 as power source 315. The power source 315 is connected in series with a parallel combination of a diode 320 and a switch 325 (also referred to as a power source electronic switch). The diode 320 and switch 325 control the flow of current from the power source 315. For example, the switch 325 is switchable between a conducting state and a non-conducting state. When the switch 325 is in the conducting state, current can flow bidirectionally to and from the power source 315. When the switch 325 is in the non-conducting state, however, current can only flow to the power source 315 through the diode 320. A capacitor 330 is connected in parallel to the power source 315, as shown in FIG. 3. The capacitor 330 helps to smooth the voltage from (and to) the power source 315. The electronic processor 135 controls the state of the switch 325 as well as the state of each of the electronic switches in the power switching network 120.

In the illustrated embodiment, the electronic processor 135 is implemented by a microprocessor that is in communication with the memory 137 storing instructions that are retrieved and executed by the microprocessor to implement the functions of the electronic processor 135 described herein. In other embodiments, the electronic processor 135 may include for example, an application specific integrated circuit, or the like. In some embodiments, the processor implementing the electronic processor 135 also controls other aspects of the power tool 10 such as, for example, a fuel gauge (e.g., a battery charge level indicator), recording usage data, communication with an external device, and the like (e.g., the auxiliary components 145).

To drive the motor 15 forward, the electronic processor 135 sets the switch 325 to be in the conducting state, and activates a high side electronic switch 205 and a low side electronic switch 220. As shown in FIG. 3, the high side electronic switch 205 is on a first side of the first phase 202 of the motor 15 and the low side electronic switch 220 is on a second side of the first phase 202. In such a configuration, the first phase 202 of the motor 15 is connected such that the back-emf has an opposite polarity with respect to the power source 315. Accordingly, while the electronic processor 135 maintains the first high side electronic switch 205 and the first low side electronic switch 220 in a conducting state, the back-emf detracts from the overall power provided to the motor 15. In other words, the motor current is set by dividing the difference between the voltage from the power source 315 and the back-emf by the resistance of the motor 15. That is, the motor current is set based on the equation:

$$I_{motor} = \frac{(V_{power\ source} - V_{back-emf})}{R_{motor}}.$$

The electronic processor 135 determines which high side electronic switches 205-215 and low side electronic switches 220-230 to place in the conducting state based on the position of the rotor in relation to the stator of the motor 15. In particular, each activation of a pair of a high side electronic switch 205-215 and a low side electronic switch 220-230 rotates the motor 15 approximately 120 degrees. When the motor 15 rotates about 60 degrees, the electronic processor 135 deactivates one pair of electronic switches and activates a different pair of electronic switches to energize a different phase of the motor 15. In particular, the electronic processor 135 activates the first high side electronic switch 205 and the first low side electronic switch 220 to drive the first phase 202 of the motor 15 forward. The electronic processor 135 activates the second high side electronic switch 210 and the second low side switch 225 to drive the second phase 203 of the motor 15 forward, and the electronic processor 135 activates the third high side electronic switch 215 and the third low side switch 230 to drive the third phase 204 of the motor 15 forward. The frequency with which the electronic processor 135 activates each electronic switch 205-230 is based on a target speed of the motor 15.

Figure 4:
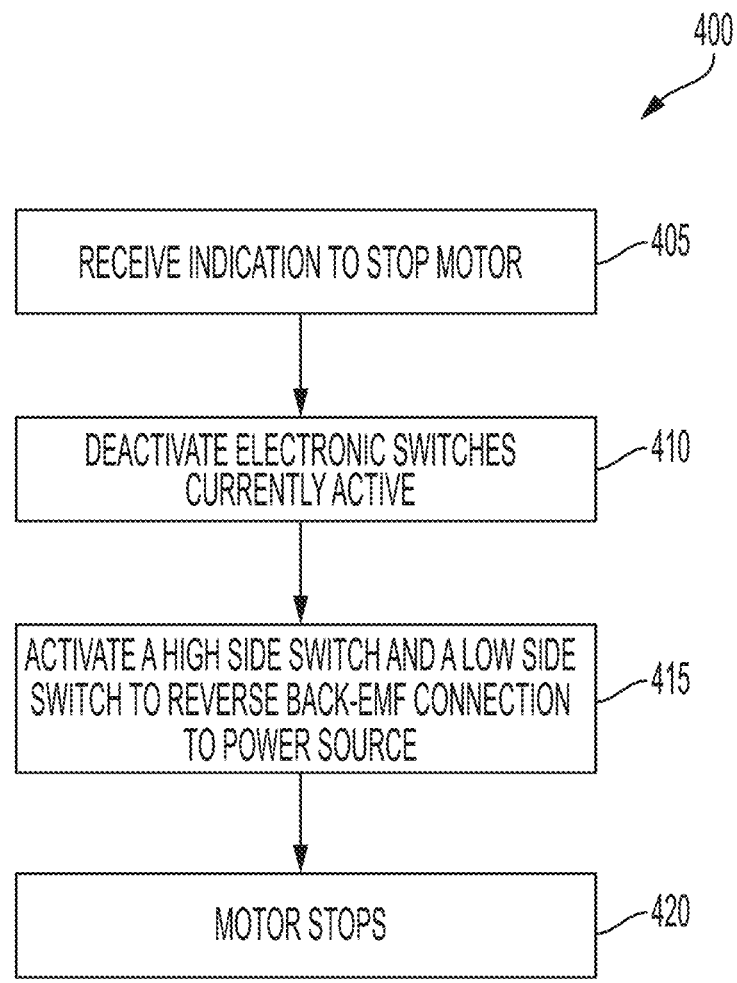
FIG. 4 is a flowchart illustrating a method of electronically braking the motor of the power tool of FIGS. 1 and 2A.

In the illustrated embodiment, the electronic processor 135 also implements electronic braking of the motor 15. FIG. 4 is a flowchart illustrating a method 400 of electronically braking the motor 15. In step 405, the electronic processor 135 receives an indication to stop the motor 15. The indication may correspond to, for example, releasing the trigger 55, turning off the power tool 10, or a different indication. The electronic processor 135 then deactivates the electronic switches 205-230 currently activated (step 410). Referring back to FIG. 3, before receiving the indication to stop the motor 15, the electronic processor 135 drives the motor 15 forward by activating, for example, the first high side electronic switch 205 and the first low side electronic switch 220, as described above. Upon receiving the indication to stop the motor 15, the electronic processor 135 deactivates both the first high side electronic switch 205 and the first low side electronic switch 220.

The electronic processor 135 also activates a high side electronic switch 205-215 and a low side electronic switch 220-230 to reverse the connection of the back-emf with respect to the power source 315 (step 415). In the example above, after deactivating both the first high side electronic switch 205 and the first low side electronic switch 220, the electronic processor 135 activates the second high side electronic switch 210 and the third low side switch 230. By activating the second high side electronic switch 210 and the third low side switch 230, the back-emf generated by the motor 15 is used to reverse the power to the motor 15. In particular, when the second high side electronic switch 210 and the third low side switch 230 are activated, the back-emf has the same polarity as the power source 315, which allows the voltage of the power source 315 and the back-emf to combine rather than detract from each other. Additionally, because of the connection of the first phase 202 of the motor 15 with the second high side electronic switch 210 and the third low side electronic switch 230, power provided to the first phase 202 provides magnetic forces on the rotor in an opposite direction as when the first high side electronic switch 205 and the first low side electronic switch 220 are activated. Accordingly, the motor 15 stops soon after the back-emf is connected with a reversed polarity (step 420). In particular, during implementation of this electronic braking technique, braking current is defined as $$I = \frac{(V_{power\ source} + V_{back-emf})}{R_{motor}}.$$

In one embodiment, the electronic processor 135 is configured to disconnect all the high side electronic switches 205-215 and all the low side electronic switches 220-230 upon determining that the motor 15 has stopped. The electronic processor 135 may determine that the motor 15 has stopped based on motor position information. The motor position information may be provided to the electronic processor 135 from the sensors 125. For example, the electronic processor 135 may determine that the motor 15 has stopped based on a change of the motor position over a predetermined time falling below a predetermined threshold. In other examples, the electronic processor 135 may determine that the motor 15 has stopped upon the motor position not changing for a predetermined period of time. In other embodiments, the electronic processor 135 may determine that the motor 15 has stopped, based on the speed of the motor being determined to be below a threshold value. The electronic processor 135 may determine the speed of the motor 15 based on data received by the one or more sensors described above 135, such as a speed detection sensor.

As described above with respect to driving the motor 15 forward, the electronic processor 135 changes which electronic switches 205-230 are activated based on which phase is to be activated. To drive the motor 15 in reverse, the electronic processor 135 activates the second high side electronic switch 210 and the third low side electronic switch 230 to drive the first phase 202 in reverse. The electronic processor 135 activates the third high side electronic switch 215 and the first low side electronic switch 220 to drive the second phase 203 of the motor 15 in reverse. The electronic processor 135 activates the first high side electronic switch 205 and the second low side electronic switch 225 to drive the third phase 204 of the motor 15 in reverse. The frequency with which the electronic processor 135 changes which switches 205-230 are activated is based on, for example, the motor speed when the motor 15 was driving forward and a target time to stop the motor 15. In some embodiments, similar to driving the rotor forward, the switching of the switches 205-230 is controlled by the electronic processor 135 based on motor position information from the sensors 125 to time the application of braking magnetic forces on the rotor with the position of the rotor magnets.

Figure 5:
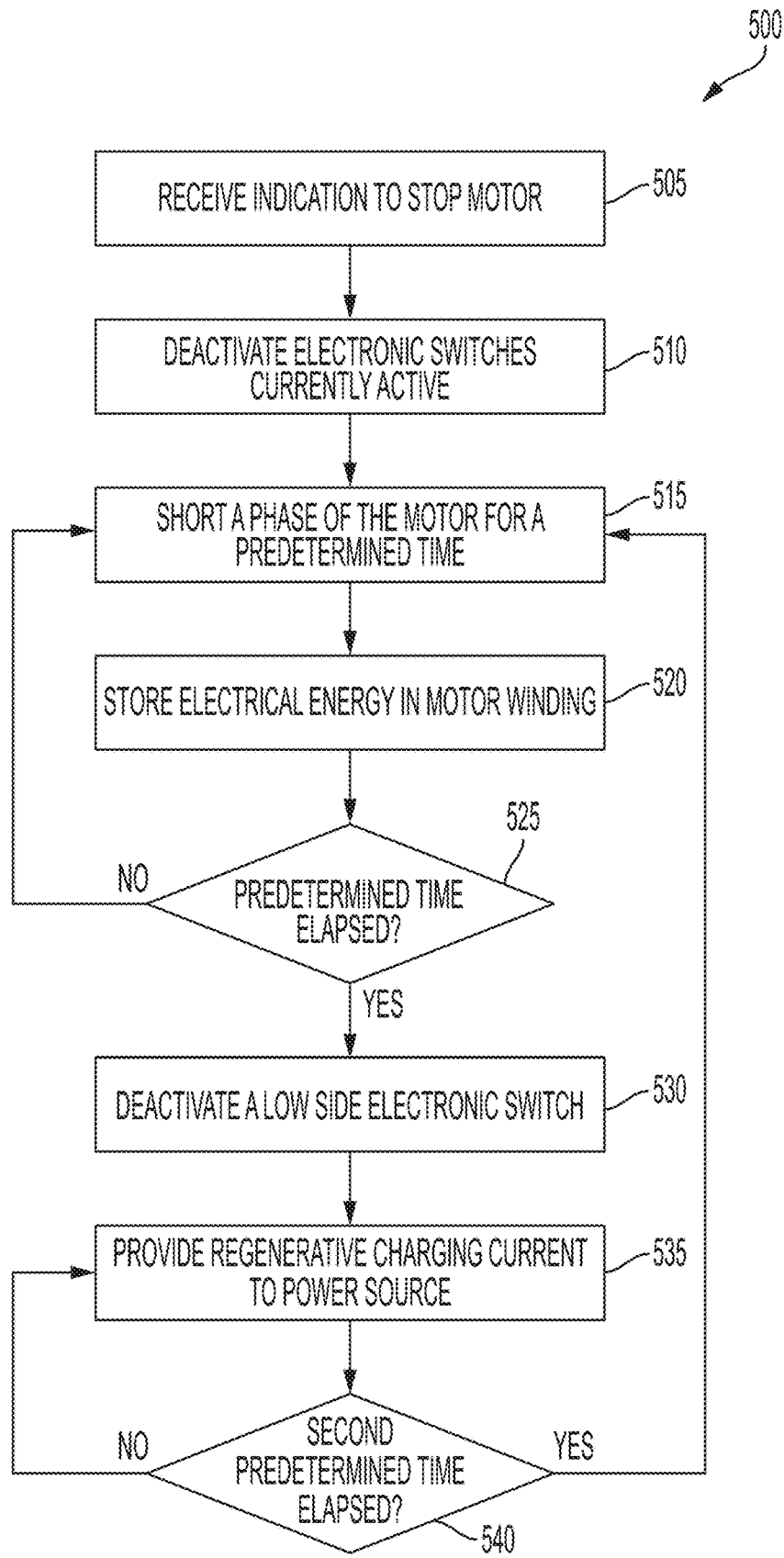
FIG. 5 is a flowchart illustrating another method of electronically braking the motor of the power tool of FIGS. 1 and 2A.

FIG. 5 is a flowchart illustrating another method 500 of braking the motor 15. In step 505, the electronic processor 135 receives an indication to stop the motor 15. As discussed above, the electronic processor 135 may receive such an indication with a release of the trigger 55. The electronic processor 135 then deactivates the electronic switches 205-230 that are currently activated (step 510). As discussed above, the electronic switches 205-230 that are activated depends on, for example, the position of the rotor with respect to the stator of the motor 15. Deactivating the electronic switches 205-230 initiates the process of braking the motor 15. The electronic processor 135 then effectively shorts a phase 202-204 of the motor 15 for a predetermined time (step 515). In particular, the electronic processor 135 activates two of the low side electronic switches 220-230 such that the phase of the motor 15 connected between the two of the low side electronic switches 220-230 is shorted to ground. For example, the electronic processor 135 activates the first low side electronic switch 220 and the third low side electronic switch 230 to short the first phase 202 of the motor 15 to ground. While the phase of the motor 15 is shorted, electrical energy is stored in the inductors 265-275 of the shorted phase (step 520). In the example above, the winding 265 stores electrical energy while the first phase 202 of the motor 15 is shorted.

Figure 6:
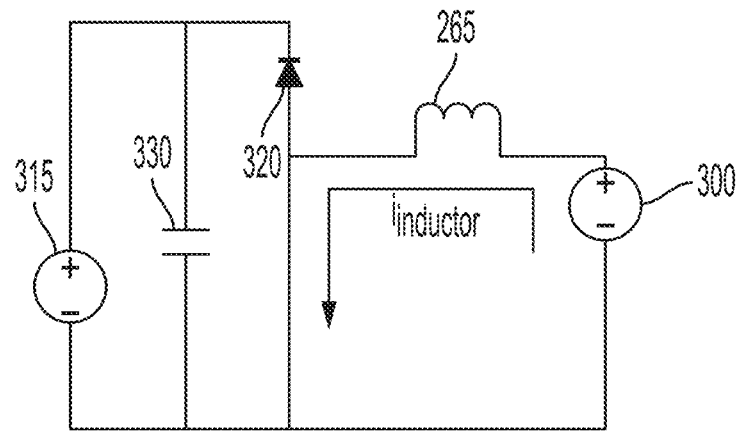
FIG. 6 illustrates a simplified diagram of the power switching network and the motor when a phase of the motor is shorted.

While the phase of the motor 15 is shorted, the resulting circuit resembles a boost converter. FIG. 6 illustrates a simplified diagram of the power switching network and the motor 15 when a phase of the motor is shorted in steps 515-525. As shown in FIG. 6, when the two low side electronic switches 220, 230 are activated, current $i_{inductor}$ flows in the winding 265 of the motor 15 and stores the electrical energy from the back-emf generated by the motor 15. Because of the activation of the low side electronic switches 220, 230, the back-emf is not directed to the power source 315. The electronic processor 135 then determines whether the predetermined time has elapsed (step 525). When the predetermined time has not yet expired, the electronic processor 135 maintains the two of the low side electronic switches 220-230 activated. In this example, the electronic processor 135 maintains both the first and the third low side electronic switches 220, 230 activated.

In step 530, when the electronic processor 135 determines that the predetermined time has elapsed, the electronic processor 135 deactivates one of the two low side electronic switches 220-230 activated in step 515. A regenerative charging current is then provided to the power source 315 (step 535). Deactivating one of the low side electronic switches 220-230 causes the electrical energy stored in the winding of the motor 15 to be released. Because only one of the low side electronic switch 220-230 is activated, the electrical energy is transmitted to the power source 315 as a charging current (see e.g., FIG. 7, described below).

The electronic processor 135 then determines whether a second predetermined time has elapsed (step 540). In some embodiments, the first predetermined time and the second predetermined time are equal (e.g., when the electronic processor 135 operates the electronic switch 220 with a 50% duty cycle). In other embodiments, however, the first predetermined time is different than the second predetermined time. When the electronic processor 135 determines that the predetermined time has not elapsed, the electronic processor 135 maintains only one of the low side electronic switches 220-230 activated and continues to provide a charging current to the power source 315 (step 535). On the other hand, when the electronic processor 135 determines that the predetermined time has elapsed, the electronic processor 135 returns to activate two of the low side electronic switches 220-230 to short the phase of the motor 15 (step 515). The electronic processor 135 repeats this process (steps 515-540) for a predetermined number of times, a predetermined time period, or until the rotor 80 reaches a particular rotational position or stops as detected by the electronic processor 135 via the sensors 125. The electronic processor 135 also changes which low side electronic switches 220-230 are activated based on the position of the rotor 80 with respect to the stator of the motor 15. Accordingly, one phase 202-204 is shorted at a time, and charging current is then provided to the power source 315 from the shorted phase 202-204 before switching to the next phase. For example, after the electronic processor 135 determines that the second predetermined time has elapsed in step 540, and the rotor 80 has advanced such that back-emf is being generated in the next phase, the electronic processor returns to step 515 and shorts the next sequential phase 202-204. The predetermined time for steps 515 and 540 is based on a set duty cycle for the low side electronic switches 220-230. That is, in some embodiments, the electronic processor 135 may not explicitly determine whether the predetermined time elapses, but rather operates the electronic switches 205-230 based on a set duty cycle.

Figure 7:
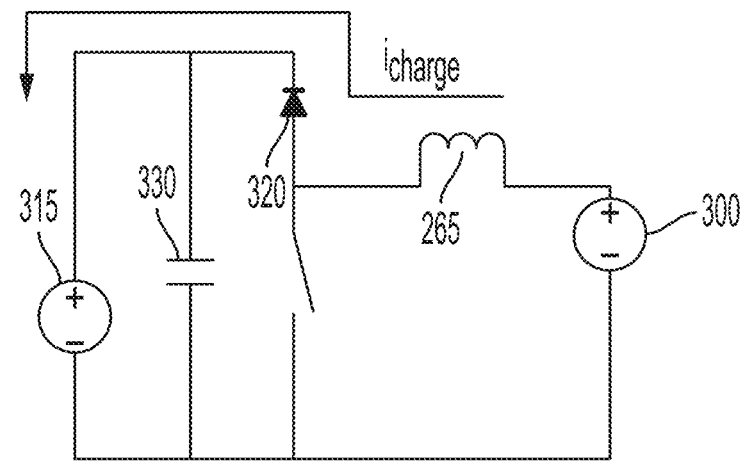
FIG. 7 illustrates a simplified diagram of the power switching network and the motor when regenerative charging current is provided to a power source.

FIG. 7 illustrates a simplified diagram of the power switching network 120 and the motor 15 when regenerative charging current is provided to a power source (e.g., in steps 530-540). In other words, the diagram of FIG. 7 illustrates the resulting circuit when only one low side electronic switch 220-230 is activated and a charging current is provided to the power source 315. In this example, the electronic processor 135 deactivates the third low side electronic switch 230, but maintains the first low side electronic switch 220 activated. As shown in FIG. 7, because the third low side electronic switch 230 is deactivated, the current ($i_{charge}$) flows from the winding of the motor 15 to the power source 315. Based on the position of the rotor 80 with respect to the stator of the motor 15, the electronic processor 135 changes which electronic switches 205-230 are activated. For example, to short the first phase 202, the electronic processor 135 activates the first low side electronic switch 220 and the third low side electronic switch 230. To short the second phase 203, the electronic processor 135 activates the second low side electronic switch 225 and the first low side electronic switch 220, and finally, to short the third phase 204, the electronic processor 135 activates the second low side electronic switch 225 and the third low side electronic switch 230.

Figure 8:
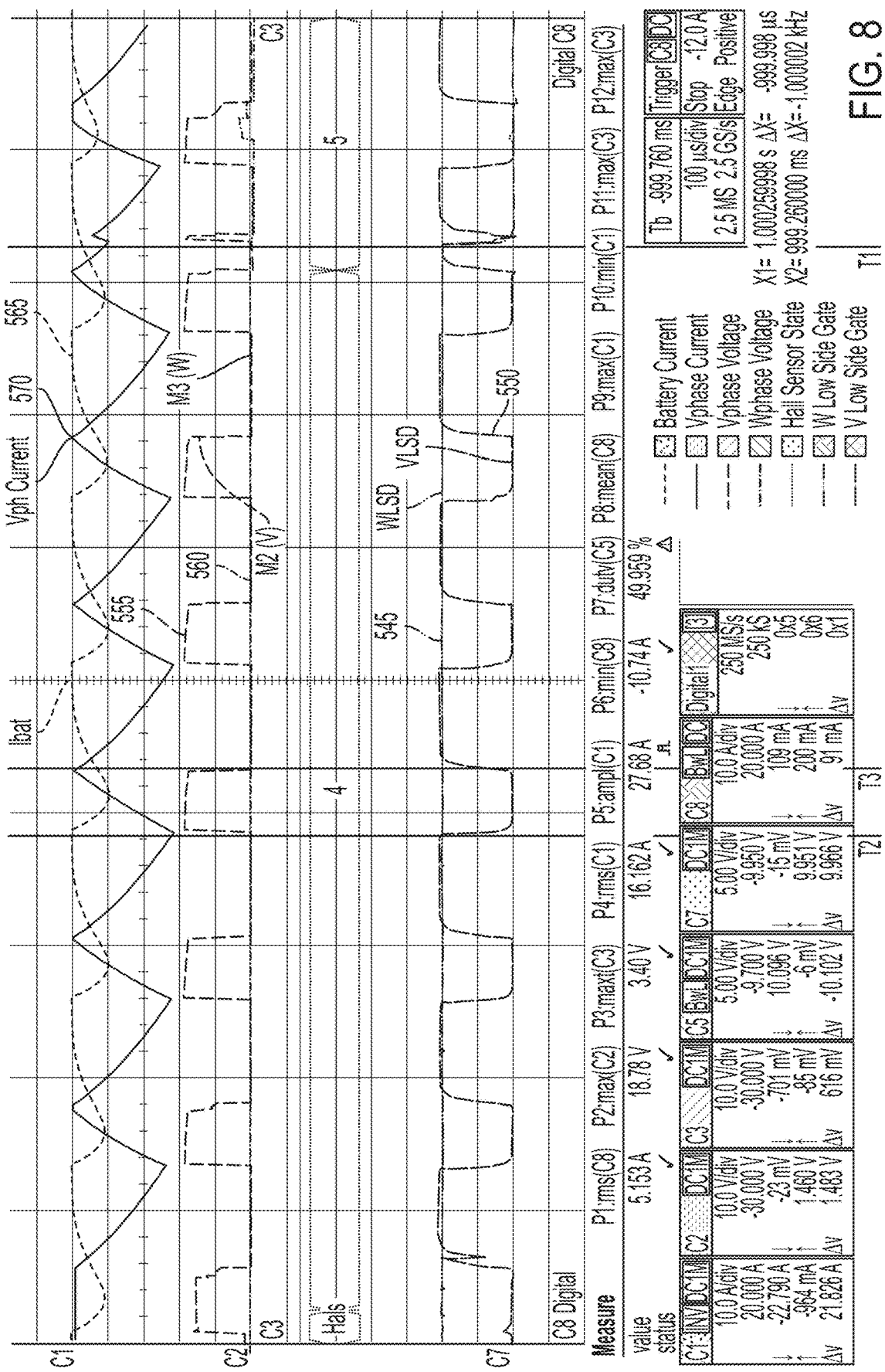
FIG. 8 illustrates exemplary waveforms to further illustrate the exchange of electrical power from the motor to the power source.

FIG. 8 illustrates exemplary waveforms to further illustrate the exchange of electrical power from the motor 15 to the power source 315. Waveform 545 represents the state of the first low side electronic switch 220 while waveform 550 represents the state of the third low side electronic switch 230. When the waveforms 545, 550 are high, the corresponding electronic switch is activated, when the waveforms 545, 550 are low, the corresponding electronic switch is deactivated. As shown in FIG. 8, and as described above with respect to steps 515-540, the first low side electronic switch 220 remains activated while the electronic processor 135 cyclically activates and deactivates the third low side electronic switch 230 at a predetermined duty cycle (e.g., 60%). This cycle continues until a different phase of the motor 15 is shorted at, for example, T1. FIG. 8 also illustrates the back-emf voltage associated with the voltage source 300 generated in the first phase 202 of the motor 15 as waveform 555, while waveform 560 represents the voltage stored in a different winding of the motor 15, for example, in the second winding 270. FIG. 8 also illustrates the charging current 565 to the power source 315 and the current 570 stored in the winding 265 of the motor 15. As shown in FIG. 8, at time T2, the back-emf voltage associated with the voltage source 300 is generated as shown by the waveform 555, which increases the current 570 stored in the first inductor 265 of the motor 15. When the electronic processor 135 deactivates the third low side electronic switch 230, the current 570 of the first inductor 265 reaches a maximum value at time T3. Upon deactivation of the third low side electronic switch 230, the first phase 202 of the motor 15 provides charging current 565 to the power source 315, which is illustrated as an increasing charging current 565 in FIG. 8.

Shorting the phases of the motor 15 as described above and providing charging current to the power source 315 increases the state of charge of the power source 315 (which extends the usage time), and also brakes the motor 15 to stop faster than simply deactivating the entire power switching network 120 or activating all low side electronic switches 220-230. As discussed above with respect to FIG. 5, the electronic processor 135 shorts the motor windings for a first predetermined time period and activates a second set of electronic switches for a second predetermined time period. In some embodiments, the first predetermined time period and the second predetermined time period are determined by a PWM signal and its associated duty cycle. That is, during a first portion of the duty cycle of the PWM signal, the power switching network 120 shorts the motor windings, and during a second portion of the duty cycle of the PWM signal, the power switching network 120 provides the charging current 565 to the power source 315.

Figure 9:
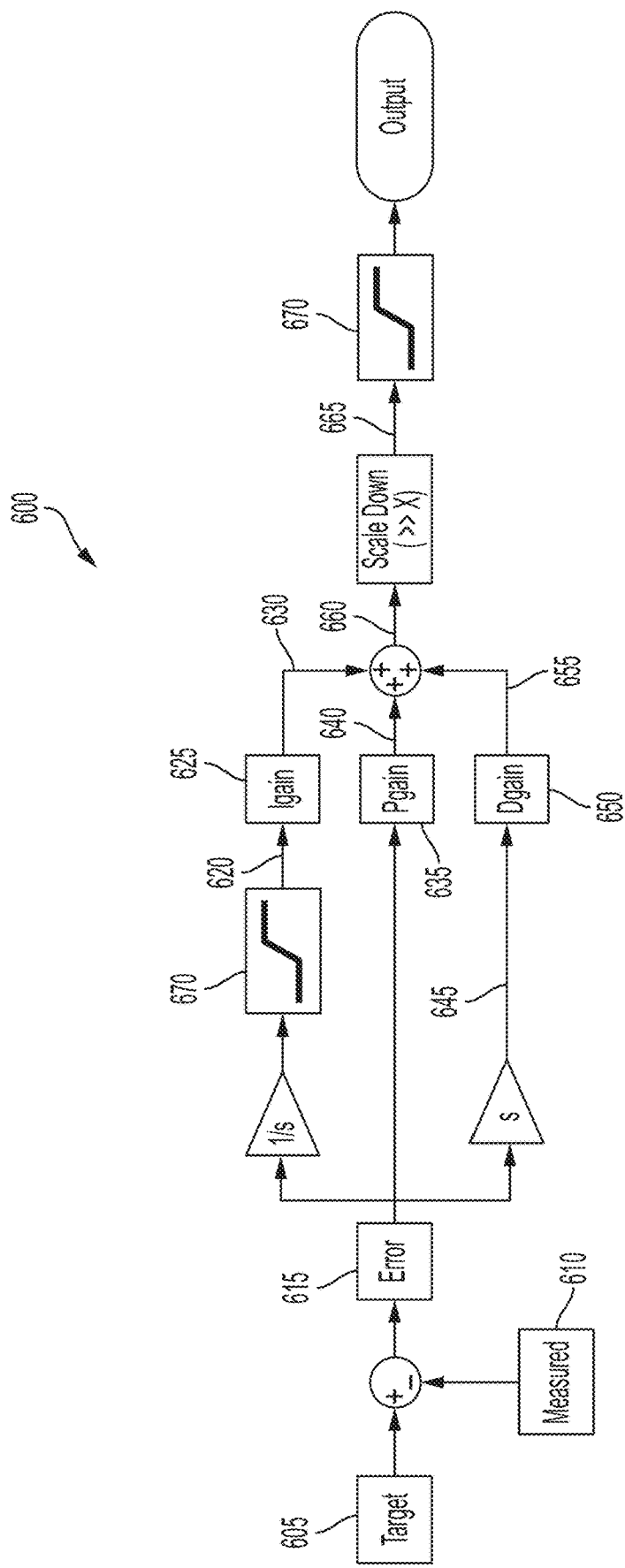
FIG. 9 illustrates a schematic diagram of a proportional-integral-derivative (PID) controller for electronic braking the motor of the power tool of FIGS. 1 and 2A.

In particular, in one embodiment, the electronic processor 135 determines the duty cycle of the PWM signal to control the power switching network 120 to stop the motor 15 at a predetermined deceleration rate or speed. FIG. 9 illustrates a schematic diagram of a proportional-integral-derivative (PID) controller 600 executed by the electronic processor 135 to control the PWM signal of the power switching network 120. As shown in FIG. 9, the electronic processor 135 receives a target deceleration speed 605 for the motor 15. The target deceleration speed 605 is a predetermined value, for example, stored in and obtained from the memory 137. The target deceleration speed 605, in some embodiments, is defined by the maximum motor speed (rotations per second (RPM)) divided by the desired brake time (milliseconds (ms)). For example, assuming a maximum motor speed of 18,000 RPM and 3,000 ms, the target deceleration speed is set to 6 RPM/ms (i.e., 18,000 RPM/3,000 msec=6 RPM/msec). In other embodiments, a different value is selected for the target deceleration speed 605 using one or more of a different maximum motor speed, desired brake time, and target deceleration equation. The electronic processor 135 also receives a measured motor speed 610. The electronic processor 135 may, for example, receive the measured motor speed 610 from a speed sensor (of the sensors 125) in the tool 110. The electronic processor 135 then calculates an error (i.e., a difference) 615 between the target deceleration speed 605 and the measured motor speed 610. The electronic processor 135 then calculates the integral of the error signal 620 and applies an integral gain 625 to generate an integral component 630. The electronic processor 135 also applies a proportional gain 635 to the error 615 to generate a proportional component 640. Additionally, the electronic processor 135 calculates the derivative of the error signal 645 and applies a derivative gain 650 to generate a derivative component 655.

The electronic processor 135 then combines the integral component 630, the proportional component 640, and the derivative component 655 to generate an adjustment signal 660. The electronic processor 135 then uses the adjustment signal 660 to determine the duty cycle for the PWM signal controlling the power switching network 120. In some embodiments, the electronic processor 135 performs additional signal processing to the adjustment signal 660 before using it to adjust the duty cycle of the PWM signal. In particular, in the illustrated embodiment, the electronic processor 135 scales down the adjustment signal 660 to generate a scaled adjustment signal 665. Additionally, the electronic processor 135 may optionally implement a saturation function 670 such that the adjustment signal 660 (or the scaled adjustment signal 665) remains within a specified lower and upper limit. In some embodiments, the electronic processor 135 also implements the saturation function 670 after calculating the integral of the error signal 620 to keep the integral within a specified lower and upper limit. By implementing the described PID controller 600, the electronic processor 135 is able to adjust the duty cycle of the PWM signal such that the motor 15 decelerates at the target deceleration speed 605.

Figure 10:
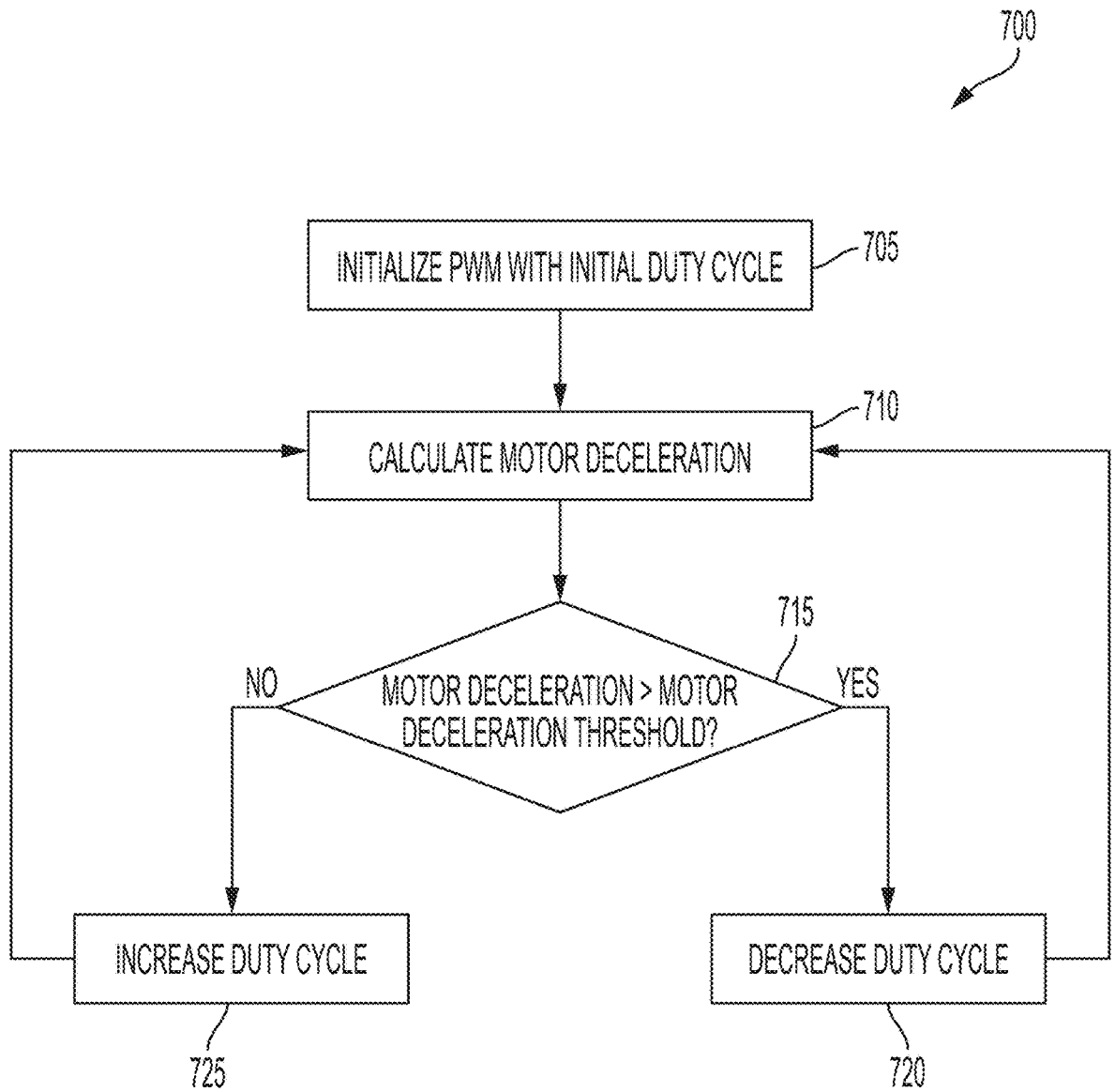
FIG. 10 is a flowchart illustrating a method of adjusting a PWM signal to decelerate the motor of the power tool of FIGS. 1 and 2A at a particular rate.

In some embodiments, the electronic processor 135 implements a hunt-and-seek control to ensure the motor 15 decelerates at a target deceleration rate. FIG. 10 is a flowchart illustrating a method 700 of adjusting the PWM signal to decelerate the motor 15 at a particular rate. As shown in FIG. 10, the electronic processor 135 initializes the PWM signal with an initial duty cycle value (step 705). The initial duty cycle value may correspond to, for example, a 50% duty cycle. In other embodiments, the initial duty cycle may be different based on, for example, the forward speed at which the motor 15 was operating before receiving the request to cease operation of the motor 15. The electronic processor 135 then calculates the current motor deceleration (step 710). In one embodiment, the electronic processor 135 calculates the motor deceleration by calculating the speed change of the motor 15 based on the speed sensor, for example, every second. The electronic processor 135 then determines whether the motor deceleration exceeds a motor deceleration threshold (step 715). The motor deceleration threshold corresponds to a minimum desired deceleration that may be based on, for example, industry standards. In one embodiment, the motor deceleration threshold corresponds to the ratio of the maximum speed for the motor 15 over a target brake time. The target brake time may be a predetermined time and may, in some embodiments, be based on industry standards.

When the electronic processor 135 determines that the motor deceleration exceeds the motor deceleration threshold, the electronic processor 135 decreases the duty cycle of the PWM signal for the power switching network 120 (step 720). Reducing the duty cycle of the PWM signal decreases the braking force provided to the motor 15. Accordingly, the motor 15 may require more time to stop when the duty cycle of the PWM signal is reduced. When the electronic processor 135 determines that the motor deceleration does not exceed the motor deceleration threshold, the electronic processor 135 increases the duty cycle of the PWM signal (step 725). Increasing the duty cycle of the PWM signal enables the motor 15 to stop faster.

Although the implementation of the PID controller 600 and the implementation of the hunt-and-seek control have been described with respect to the method 500 of braking the motor 15 described with respect to FIG. 5, the electronic processor 135, in some embodiments, implements the PID controller 600 or the method of FIG. 10 when implementing the method 400 of braking the motor 15 described with respect to FIG. 4. In such an embodiment, the PWM signal is provided to the activated switches in step 415 to quickly cycle the switches on and off in accordance with the PWM duty cycle.

The braking techniques described above provide a more efficient and faster braking of the motor 15 than that achieved by simply deactivating the power switching network 120. In addition, some of the techniques described above also provide power to a power source 315 such that the usage time of the power source 135 may be extended.

We claim:
1. A battery pack powered hand tool comprising:
 a motor;
 a power switching network;
 a power source; and
 an electronic processor in communication with the power switching network, the electronic processor configured to:
  activate a pulse width modulation ("PWM) signal having an initial duty cycle value,
  receive an indication to stop the motor during operation of the motor,
  determine a deceleration of the motor,
  determine whether the deceleration of the motor exceeds a motor deceleration threshold,
  modify the initial duty cycle value to a second duty cycle value according to the deceleration of the motor,
  wherein the initial duty cycle value is based on a forward speed at which the motor was operating before receiving the indication to stop the motor, and
  wherein the motor deceleration threshold corresponds to a minimum deceleration during a predetermined brake time.

2. The battery pack powered hand tool of claim 1, wherein the initial duty cycle value is 50%.

3. The battery pack powered hand tool of claim 1, wherein the electronic processor is configured to calculate the deceleration of the motor by calculating a speed change of the motor.

4. The battery pack powered hand tool of claim 1, wherein the PWM signal is controlled by a proportional-integral-derivative ("PID") controller.

5. A method for braking a motor in a battery pack powered power tool, the battery pack powered power tool including a motor, a power switching network, a power source, and an electronic processor in communication with the power switching network, the method comprising:
 activating a pulse width modulation ("PWM") signal having an initial duty cycle value;
 receiving an indication to stop the motor during operation of the motor;
 determining a deceleration of the motor;
 determining whether the deceleration of the motor exceeds a motor deceleration threshold; and
 modifying the initial duty cycle value to a second duty cycle value according to the deceleration of the motor;
 wherein the initial duty cycle value is based on a forward speed at which the motor was operating before receiving the indication to stop the motor, and
 wherein the motor deceleration threshold corresponds to a minimum deceleration during a predetermined brake time.

6. The method of claim 5, wherein the initial duty cycle value is 50%.

7. The method of claim 5, further comprising calculating the deceleration of the motor by calculating a speed change of the motor.

8. The method of claim 5, wherein the PWM signal is controlled by a proportional-integral-derivative ("PID") controller.

9. A battery pack powered power tool comprising:
 a power source;
 a three-phase DC motor;

a power switching network including a plurality of high side electronic switches and a plurality of low side electronic switches, wherein a first phase of the motor is connected between a first low side electronic switch and the power source, and further connected to the power source via a first high side electronic switch, the first high side electronic switch in parallel with a diode; and an electronic processor in communication with the power switching network, the electronic processor configured to:

receive an indication to stop the motor during operation of the motor, activate the first low side electronic switch and a second low side electronic switch for a first predetermined time in response to receiving the indication to stop the motor, such that a back-electromagnetic force generated by the motor is stored in the first phase of the motor; and periodically activate and deactivate the second low side electronic switch until a rotor of the motor reaches a predetermined speed.

10. The battery pack powered power tool of claim 9, wherein a regenerative current, provided via the diode in response to deactivation of the second low side electronic switch, applies a braking force to the motor.

11. The battery pack powered power tool of claim 9, wherein the electronic processor is further configured to:

activate the first low side electronic switch and a third low side electronic switch for a second predetermined time in response to receiving the indication to stop the motor;

deactivate the third low side electronic switch after the second predetermined time such that a second regenerative current is provided to the power source via the diode;

activate the third low side electronic switch and the second low side electronic switch for a third predetermined time in response to receiving the indication to stop the motor; and deactivate the second low side electronic switch after the third predetermined time such that a third regenerative current is provided to the power source.

12. The battery pack powered power tool of claim 11, wherein the electronic processor is further configured to activate and deactivate the plurality of low side electronic switches based on a determined position of a rotor of the motor.

13. The battery pack powered power tool of claim 12, wherein the electronic processor is further configured to activate the power switching network by applying a pulse width modulation ("PWM") signal at a set duty cycle to the plurality of high side electronic switches and the plurality of low side electronic switches.

14. The battery pack powered power tool of claim 13, wherein the first predetermined time is based on the set duty cycle applied to the first low side electronic switch and the second low side electronic switch, the second predetermined time is based on the set duty cycle applied to the first low side electronic switch and the third low side electronic switch, and the third predetermined time is based on the set duty cycle applied to the third low side electronic switch and the second low side electronic switch.

15. The battery pack powered power tool of claim 13, wherein the set duty cycle of the PWM signal is determined to stop the motor at a predetermined deceleration rate.

16. The battery pack powered power tool of claim 13, wherein the PWM signal is controlled by a proportional-integral-derivative (PID) controller executed by the electronic processor.

* * * * *